Jan. 31, 1928.
C. E. SOUCY
ANIMAL TRAP
Filed Dec. 3, 1926  3 Sheets-Sheet 1
1,657,976
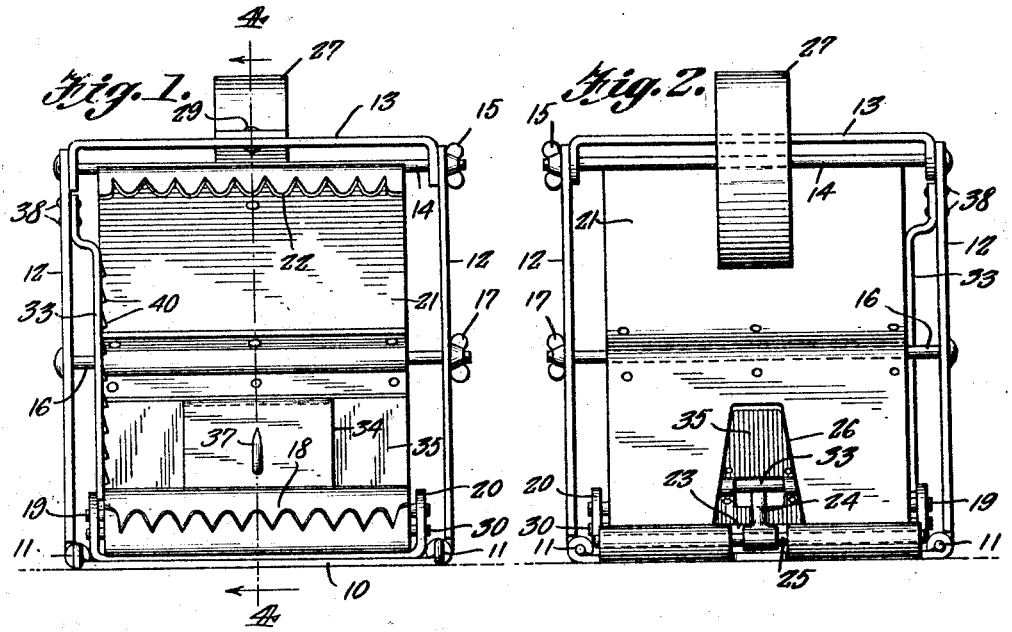
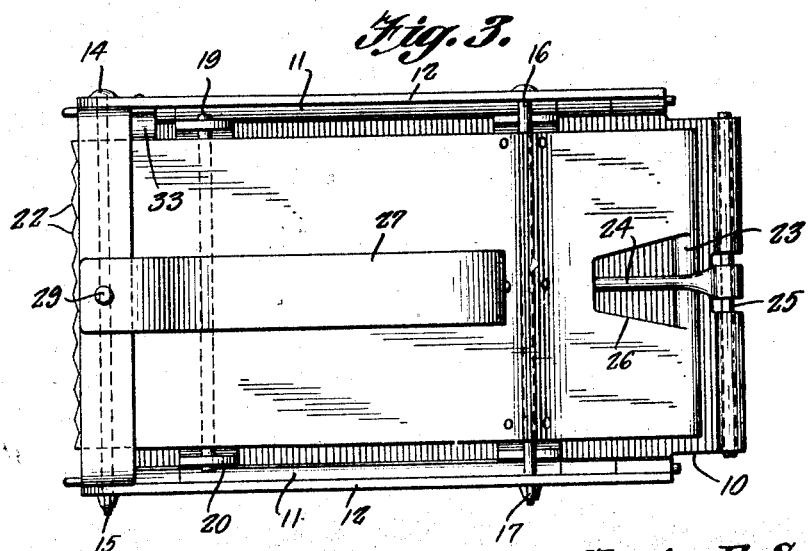
Clovis E. Soucy,
INVENTOR
BY Victor J. Evans
ATTORNEY
WITNESS:

Jan. 31, 1928.

C. E. SOUCY 1,657,976

ANIMAL TRAP

Filed Dec. 3, 1926

Clovis E. Soucy,
INVENTOR

BY Victor J. Evans
ATTORNEY

WITNESS:
P. L. Hickey.

Jan. 31, 1928.

C. E. SOUCY 1,657,976

ANIMAL TRAP

Filed Dec. 3, 1926    3 Sheets-Sheet 3

Patented Jan. 31, 1928.

1,657,976

UNITED STATES PATENT OFFICE.

CLOVIS E. SOUCY, OF PORT ALFRED, CANADA.

ANIMAL TRAP.

Application filed December 3, 1926. Serial No. 152,452.

This invention relates to improvements in animal traps and has for an object the provision of a trap which will catch and securely hold animals of various kinds and sizes, without injury to their fur.

Another object of the invention is the provision of a trap which may be covered by moss or other material, so as to effectually conceal the same, without interfering with its operation, and which may be placed in the open in snowy or other inclement weather and the operating mechanism of the trap protected.

Another object of the invention is the provision of a trap of novel construction, wherein the same may be readily taken apart for repair and reassembly, so that new parts may be quickly substituted in the event of damage.

With the above and other objects in view, the invention further includes the following novel features and details of construction, to be hereinafter more fully described, illustrated in the accompanying drawings and pointed out in the appended claims.

In the drawings:—

Figure 1 is a front elevation of the trap showing the same in open or set position.

Figure 2 is a rear elevation of the same.

Figure 3 is a top plan view.

Figure 4:
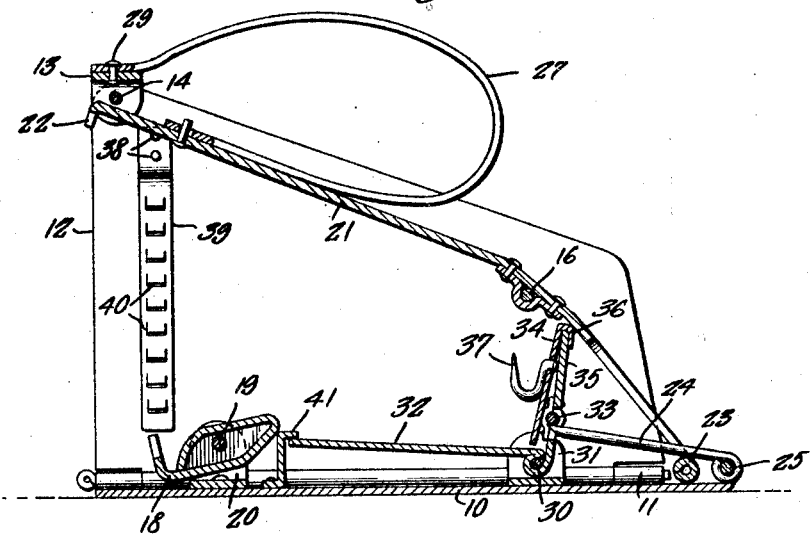
Figure 4 is a longitudinal sectional view with the jaws of the trap open.
Figure 5:
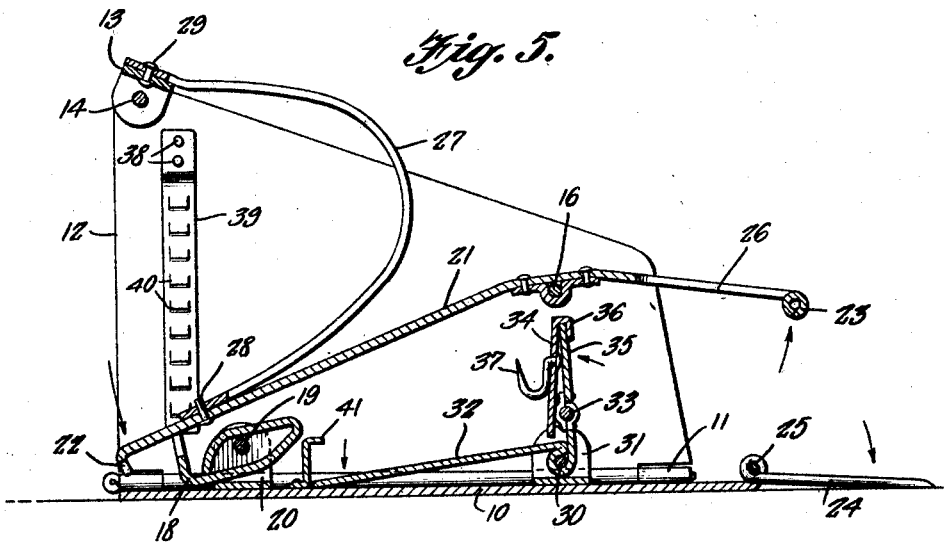
Figure 5 is a similar view showing the position of the jaws after the trap has been sprung.
Figure 6:
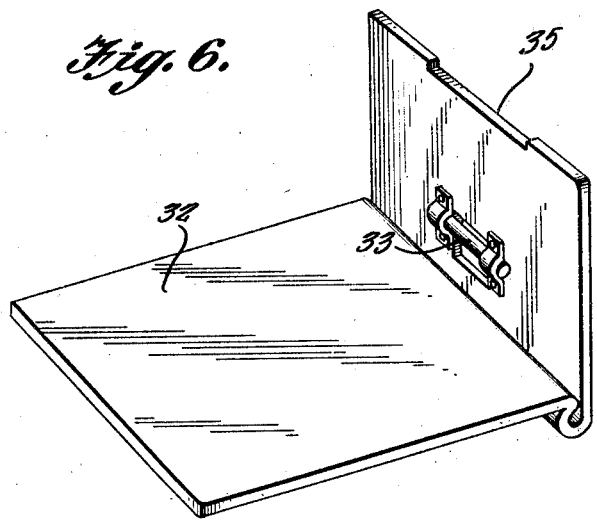
Figure 6 is a detail perspective view of the pivotally mounted L-shaped member.
Figure 7:
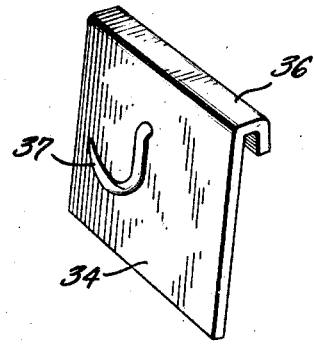
Figure 7 is a detail perspective view of the bait carrier.
Figure 8:
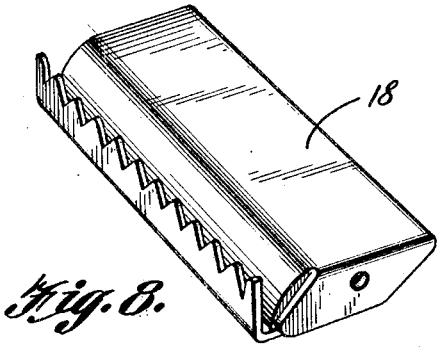
Figure 8 is a like view of one of the jaws.

Referring to the drawings in detail wherein like characters of reference denote corresponding parts, the reference character 10 indicates the base of the trap, which is shown in the form of a plate and which has hingedly secured to its opposite side edges as shown at 11, side plates 12. The plates 12 are connected at their upper forward corners by means of a spacing bar 13, whose opposite ends extend at a right angle to engage the side walls 12 and permit of the passage of a retaining rod 14. This rod is provided at one end with a head and its opposite end is threaded to receive a thumb nut 15. A similar rod 16 extends transversely above the bar 10 through the side walls 12 and is also provided with a wing nut 17. It will be apparent that by removing the nuts 15 and 17, the side walls 12 may be swung hingedly outward and convenient access had to the interior mechanism of the trap.

The bar 10 of the trap carries a lower jaw 18 which is preferably pivotally mounted upon a rod 19 which is carried by spaced ears 20 secured to the base.

The rod 16 serves as a pivot rod for a combined cover and jaw plate 21, the said plate carrying at one end teeth 22, which cooperate with teeth of the jaw 18. The plate 21 is extended beyond the pivot rod 16 and carries a trigger bar 23 which is designed to be engaged by a trigger 24. This trigger is pivotally mounted upon the base as shown at 25 and the extended portion of the plate 21 is provided with an opening 26 for the passage of this trigger. The jaw 22 is forced downward to a closed position with the jaw 18 by means of a spring 27. One end of this spring is secured to the plate 21 as shown at 28 and the opposite end is secured as shown at 29 to the spacing bar 13.

Pivotally mounted as shown at 30 between spaced ears 31 which are carried by the bar 10, is a substantially L-shaped member, one arm of which forms a platform 32. The other arm of this member extends upward and carries a bar 33 which is adapted to be engaged by the free end of the trigger 24 and provide a latch for the trigger. A plate 34 engages over the upper end of the latch carrying arm 35 and for this purpose the plate is provided with a flange 36. The plate 34 carries a bait hook 37.

When the trap is arranged as shown in Figure 4, an animal entering the trap will depress the platform 32 in his attempt to reach the bait. The trigger 24 will then be released and the jaw 22 forced downward under the action of the spring 27.

In order to hold the jaws in closed position so as to prevent the trapped animal from forcing the jaw 22 upward, one of the walls 12 has secured thereto as shown at 38, the upper end of a bar 39. This bar is spaced from the wall 12 for the major portion of its length and is of resilient material. Teeth 40 are spaced along the bar 38 and are in the path of movement of the plate 21, so that when the latter is forced downward it will pass the teeth, but upward movement will be prevented until the free end of the bar 39 is forced against the wall 12.

By reason of the side walls 12 and the combined cover and jaw plate 21, the trap may be concealed beneath moss or other material without interfering with its operation. Further, the construction is such that the operating mechanism will not be interfered with by snow or sleet.

A stop 41 which rises from the base 10 serves to limit upward movement of the platform 32.

The invention is susceptible of various changes in its form, proportions and minor details of construction and the right is herein reserved to make such changes as properly fall within the scope of the appended claims.

Having described the invention what is claimed is:—

1. An animal trap comprising a base, a jaw carried by the base, a spring actuated jaw pivotally mounted above the base, a trigger, means engageable by the trigger to hold the pivotally mounted jaw in open position, a trigger latch, means controlled by the animal within the trap to release the trigger and permit operation of the spring actuated jaw and spaced yieldable teeth located in the path of the spring actuated jaw to lock the same against opening movement.

2. An animal trap comprising a base, a jaw carried by the base, a spring actuated jaw pivotally mounted above the base, a trigger, means engageable by the trigger to hold the pivotally mounted jaw in open position, a trigger latch, means controlled by an animal within the trap to release the trigger and permit operation of the spring actuated jaw, a yieldable bar located at one side of the spring actuated jaw and teeth spaced along the bar in the path of said spring actuated jaw to lock the same against opening movement.

3. An animal trap comprising a base, a jaw carried by the base, a spring actuated plate mounted for pivotal movement above the base, a jaw carried by the plate, a trigger bar also carried by and disposed transversely at the rear end of the plate, a trigger engageable with the bar to hold the plate carried jaw in open position, a latch engageable by the trigger and means controlled by an animal within the trap to actuate the latch and release the trigger.

4. An animal trap comprising a base, a jaw carried by the base, a spring actuated plate mounted for pivotal movement above the base, a jaw carried by the plate, a trigger bar also carried by the plate, a trigger engageable with the bar to hold the plate carried jaw in open position, an L-shaped member mounted for pivotal movement between the base and the spring actuated plate, one arm of said member defining a platform, a trigger latch carried by the other arm of the L-shaped member for engagement by the trigger and a bait holder carried by the L-shaped member.

5. An animal trap comprising a base, a jaw carried by the base, a spring actuated plate mounted for pivotal movement above the base, a jaw carried by the plate, a trigger bar also carried by the plate, a trigger engageable with the bar to hold the plate carried jaw in open position, an L-shaped member mounted for pivotal movement between the base and the spring actuated plate, one arm of said member defining a platform, a trigger latch carried by the other arm of the L-shaped member for engagement by the trigger, a bait holder carried by the L-shaped member and a stop extending upwardly from the base in the path of the platform.

6. An animal trap comprising a base, side walls rising from the base, a spacing bar connecting the side walls, a cover plate pivotally mounted between the side walls above the base, a jaw carried by the base, a jaw carried by the cover plate, spring means secured to the spacing bar and cover plate to force the cover plate downward to close the jaws, a trigger adapted to hold the cover plate elevated with the jaws in open position and means controlled by an animal within the trap to actuate the trigger.

7. An animal trap comprising a base, side walls rising from the base, a spacing bar connecting the side walls, a cover plate pivotally mounted between the side walls above the base, a jaw carried by the base, a jaw carried by the cover plate, a spring having one end secured to the spacing bar and its opposite end secured to the cover plate to force the latter downward to close the jaws, a trigger adapted to hold the cover plate elevated and the jaws in open position and means controlled by an animal within the trap to actuate the trigger.

8. An animal trap comprising a base, side walls rising from the base, a spacing bar connecting the side walls, a cover plate pivotally mounted between the side walls above the base, a jaw carried by the base, a jaw carried by the cover plate, spring means to force the cover plate downward to close the jaws, a trigger adapted to hold the cover plate elevated with the jaws in open position, means controlled by an animal within the trap to actuate the trigger and a yieldable toothed bar having one end secured to one of the side walls with the teeth located in the path of the cover plate to resist opening movement of the jaws.

In testimony whereof I affix my signature.

CLOVIS E. SOUCY.